United States Patent
Saha et al.

(10) Patent No.: US 11,163,960 B2
(45) Date of Patent: Nov. 2, 2021

(54) AUTOMATIC SEMANTIC ANALYSIS AND COMPARISON OF CHATBOT CAPABILITIES

(71) Applicant: International Business Machines Corporation, Armonk, NY (US)

(72) Inventors: Diptikalyan Saha, Bangalore (IN); Rema Ananthanarayanan, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 16/388,031

(22) Filed: Apr. 18, 2019

(65) Prior Publication Data

US 2020/0334332 A1    Oct. 22, 2020

(51) Int. Cl.
*G06F 40/30*  (2020.01)
*G06F 3/0484*  (2013.01)
*G06F 40/295*  (2020.01)

(52) U.S. Cl.
CPC ............ *G06F 40/30* (2020.01); *G06F 3/0484* (2013.01); *G06F 40/295* (2020.01)

(58) Field of Classification Search
CPC ....... H04L 51/02; H04L 9/3236; H04L 51/16; G06N 3/0454; G10L 2015/227; G10L 13/08; G10L 2015/223; G06F 40/30; G06F 40/295; G06F 3/0484; G06F 40/35; G06F 16/3344; G06F 16/3329; G06F 3/167; G06F 11/3688; G06F 16/24522; G06F 21/31; G06F 21/32; G06F 16/137; G06F 16/685; G06F 40/205
See application file for complete search history.

(56) References Cited

U.S. PATENT DOCUMENTS

| 9,075,713 B2 | 7/2015 | Jones et al. |
| 10,116,900 B2 | 10/2018 | Wood et al. |

(Continued)

FOREIGN PATENT DOCUMENTS

IN    201821023424 A    7/2018

OTHER PUBLICATIONS

IBM, "Domain-Based Evaluation Metric for Spoken Dialog Systems," IPCOM000184220D, Jun. 16, 2009, 6 pages.

(Continued)

*Primary Examiner* — Abdelali Serrou
(74) *Attorney, Agent, or Firm* — Ryan, Mason & Lewis, LLP (57) ABSTRACT

Techniques for the automatic semantic analysis and comparison of chatbot capabilities are disclosed. A first chatbot specification associated with a first chatbot is obtained that includes a first plurality of characteristics arranged in a plurality of categories. A second chatbot specification associated with a second chatbot is obtained that includes a second plurality of characteristics arranged in the plurality of categories. One or more differences between the first plurality of characteristics and the second plurality of characteristics for each of the plurality of categories are identified based at least in part on the first plurality of characteristics and the second plurality of characteristics. A natural language expression corresponding to the identified one or more differences is generated and presented to a user via a graphical user interface.

13 Claims, 7 Drawing Sheets

(56) References Cited

U.S. PATENT DOCUMENTS

| | | | | |
|---|---|---|---|---|
| 10,148,600 | B1* | 12/2018 | White | G06N 3/006 |
| 10,860,802 | B2* | 12/2020 | Cristian | H04L 51/16 |
| 2011/0258181 | A1* | 10/2011 | Brdiczka | G06F 16/355 |
| | | | | 707/723 |
| 2011/0258193 | A1* | 10/2011 | Brdiczka | G06Q 10/107 |
| | | | | 707/739 |
| 2012/0041575 | A1 | 2/2012 | Maeda et al. | |
| 2012/0245944 | A1* | 9/2012 | Gruber | G10L 15/26 |
| | | | | 704/270.1 |
| 2013/0006611 | A1* | 1/2013 | Brdiczka | G06F 40/205 |
| | | | | 704/9 |
| 2013/0282336 | A1 | 10/2013 | Maeda et al. | |
| 2018/0131645 | A1* | 5/2018 | Magliozzi | G06F 40/30 |
| 2018/0287968 | A1* | 10/2018 | Koukoumidis | G06F 16/248 |
| 2018/0337872 | A1* | 11/2018 | Fawcett | G06F 16/3329 |
| 2019/0013017 | A1* | 1/2019 | Kang | G06N 7/005 |
| 2019/0065465 | A1* | 2/2019 | Cristian | G06F 11/3688 |
| 2019/0103111 | A1* | 4/2019 | Tiwari | G06F 16/3334 |
| 2019/0108836 | A1* | 4/2019 | Kato | G10L 15/22 |
| 2019/0124020 | A1* | 4/2019 | Bobbarjung | G06Q 20/123 |
| 2019/0140986 | A1* | 5/2019 | Anderson | H04L 67/104 |
| 2019/0182184 | A1* | 6/2019 | Myung | H04L 51/02 |
| 2019/0266287 | A1* | 8/2019 | Chen | G06F 9/547 |
| 2020/0090641 | A1* | 3/2020 | Kim | G06N 3/0454 |
| 2020/0137001 | A1* | 4/2020 | Wu | G06F 40/35 |
| 2020/0334568 | A1* | 10/2020 | Liden | G06N 20/00 |
| 2021/0043208 | A1* | 2/2021 | Luan | G10L 15/22 |
| 2021/0150150 | A1* | 5/2021 | Wu | G06N 3/088 |

OTHER PUBLICATIONS

Laura Bennett, "Bot Asset Exchange," developer.ibm.com/code/exchanges/bots/, downloaded Apr. 10, 2019, 3 pages.

Robert Dale, "The Return of the Chatbots," Natural Language Engineering, Sep. 2016, pp. 811-817, vol. 22, No. 5.

D. Saha et al., "ATHENA: An Ontology-Driven System for Natural Language Querying Over Relational Data Stores," Proceedings of the VLDB Endowment, Aug. 2016, pp. 1209-1220, vol. 9, No. 12.

H. Al-Zubaide et al., "OntBot: Ontology Based ChatBot," Fourth International Symposium on Innovation in Information & Communication Technology, Nov. 29-Dec. 1, 2011, pp. 7-12.

* cited by examiner

AUTOMATIC SEMANTIC ANALYSIS AND COMPARISON OF CHATBOT CAPABILITIES

FIELD

The present application generally relates to the semantic analysis and comparison of chatbots.

BACKGROUND

Chatbots, also known as smartbots, conversational bots, chatterbots, interactive agents, conversational interfaces, conversational AIs, or artificial conversational entities are computer programs or artificial intelligence programs which conduct conversations via auditory or textual methods to achieve a desired task. Chatbots are often designed to convincingly simulate how a human would behave as a conversational partner, for example, by asking questions and responding to answers as a normal human would. As an example, chatbots may be used in various roles including customer service, social media engagement, product ordering, surveys, or other similar roles where a human would normally provide answers or otherwise communicate with a customer or other client.

SUMMARY

In one embodiment of the present invention, techniques for the automatic semantic analysis and comparison of chatbot capabilities are provided. An exemplary computer-implemented method is disclosed in which a first chatbot specification associated with a first chatbot is obtained that includes a first plurality of characteristics arranged in a plurality of categories. A second chatbot specification associated with a second chatbot is obtained that includes a second plurality of characteristics arranged in the plurality of categories. One or more differences between the first plurality of characteristics and the second plurality of characteristics for each of the plurality of categories are identified based at least in part on the first plurality of characteristics and the second plurality of characteristics. A natural language expression corresponding to the identified one or more differences is generated and presented to a user via a graphical user interface.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

When a chatbot is needed for a particular task, a user will typically search through a repository of chatbot specifications, each of which has a different set of characteristics and capabilities, to identify which chatbot will meet the requirements for the task. For example, the user may manually compare the characteristics and capabilities of similar chatbots and select the one that they believe will be best suited to the task. However, such a manual analysis and comparison of a large number of chatbot specifications may be a lengthy and painstaking manual process which only assesses the chatbot specifications of a relatively small number of chatbots in the full set of chatbot specifications found in the repository.

The techniques for the automatic semantic analysis and comparison of chatbot capabilities disclosed herein assist a user in the analyzing and comparing of chatbot specifications in a quick and easy manner that provides the user with an intuitive understanding of the differences in the capabilities of each chatbot and provides a simple and easy to understand rating of the chatbots in a variety of categories.

Figure 1:
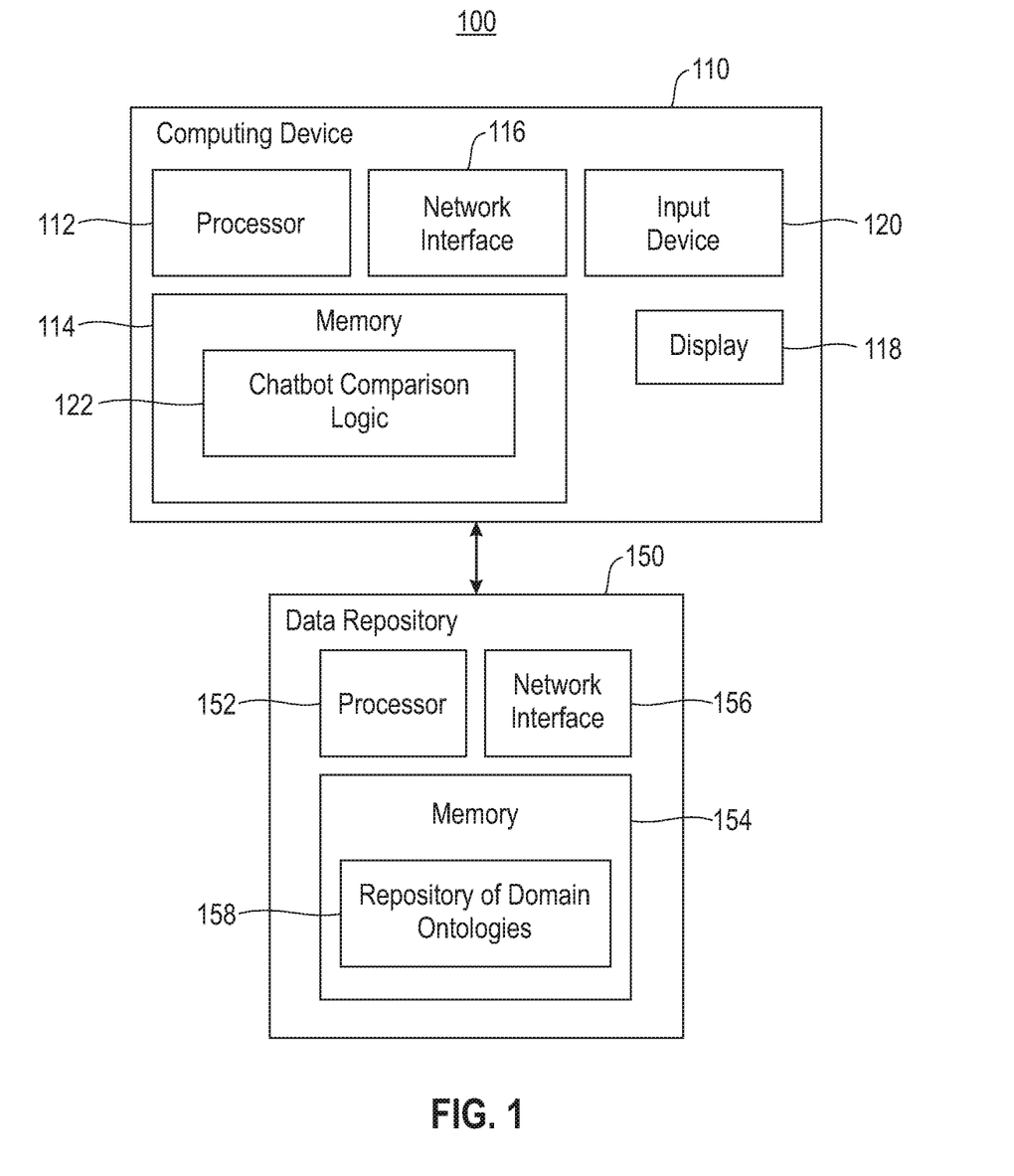
FIG. 1 is a diagram illustrating system architecture, according to an exemplary embodiment of the invention.

With reference now to FIG. 1, an embodiment of a system architecture 100 for automatic semantic analysis and comparison of chatbot capabilities is illustrated. In some embodiments, system 100 includes a computing device 110 and a data repository 150.

Computing device 110 includes at least one processor 112, memory 114, at least one network interface 116, a display 118, and an input device 120 and may include any other features commonly found in a computing device. In some embodiments, computing device 110 may include, for example, a personal computer, workstation, laptop, tablet, smart device, smart phone, smart watch, or any other similar computing device that may be used by a user.

Processor 112 may include, for example, a central processing unit (CPU), a microcontroller, Field Programmable Gate Array (FPGAs), or any other form of processing circuitry that is configured to perform various operations. Processor 112 may be configured to execute instructions as described below. These instructions may be stored, for example, in memory 114. As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor" may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Memory 114 may include, for example, computer readable media or computer readable storage media in the form of volatile memory, such as random-access memory (RAM) and/or cache memory or others. Memory 114 may include, for example, other removable/non-removable, volatile/non-volatile storage media. By way of non-limiting examples only, memory 114 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

In some embodiments, computer software including instructions or code for performing the methodologies of the invention, as described herein, may be stored in associated memory 114 and, when ready to be utilized, loaded in part or in whole (for example, into RAM) and implemented by processor 112. Such software could include, but is not limited to, firmware, resident software, microcode, and the like. The memory 114 may include local memory employed during actual implementation of the program code, bulk storage, and cache memories which provide temporary storage of at least some program code in order to reduce the number of times code must be retrieved from bulk storage during implementation.

In some embodiments, computing device 110 may include chatbot comparison logic 122, e.g., computer software instructions or code, stored in memory 114 that is configured to assist a user by automatically performing semantic analysis and comparison of chatbot capabilities as will be described in more detail below. In some embodiments, chatbot comparison logic 122 may alternatively be stored remotely from computing device 110, e.g., on a server or other system. For example, computing device 110 may access chatbot comparison logic 122 to assist a user in semantically analyzing and comparing chatbot specifications. In some embodiments, chatbot comparison logic 122 may be an application programming interface (API) that is activatable or executable by computing device 110 to offload the automatic semantic analysis and comparison of chatbot capabilities to a remote processing center, e.g., a server or other similar system.

Network interface 116 is configured to transmit and receive data or information to and from a data repository 150 or any other server, component, or computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, those used via a local area network (LAN), those used via a wide area network (WAN), or those used with any other form of communication that allows computing device 110 to transmit or receive information to or from data repository 150 including components of data repository 150.

Display 118 may include any display device that is configured to display information to a user of computing device 110. For example, in some embodiments, display 118 may include a computer monitor, television, smart television, or other similar displays. In some embodiments, display 118 may be integrated into or associated with computing device 110, for example, as a display of a laptop, smart phone, smart watch, or other smart wearable devices, as a virtual reality headset associated with computing device 110, or any other mechanism for displaying information to a user. In some embodiments, display 118 may include, for example, a liquid crystal display (LCD), an e-paper/e-ink display, an organic LED (OLED) display, or other similar display technologies. In some embodiments, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Data repository 150 may include, for example, a processor 152, memory 154, and a network interface 156 that may include similar functionality as processor 112, memory 114, and network interface 116. In some embodiments, data repository 150 may, for example, be any computing device, server, database or similar system, or any combination thereof, that is configured to interact with or provide data to computing device 110. In some embodiments, for example, data repository 150 may include a distributed storage system including a plurality of servers, databases, or other components. In some embodiments, the data stored in data repository 150 may alternatively be stored in memory 114 of computing device 110 for use by computing device 110 such that no connection to a data repository 150 may be necessary to obtain the data.

Memory 154 may include, for example, a repository of domain ontologies 158 which comprise ontologies for a variety of different domains in which chatbots may operate. For example, a domain ontology 158 associated with pizza ordering and delivery may comprise information associated with characteristics and capabilities of chatbots in the domain of pizza ordering and delivery as described in the below examples. Other ontologies for other domains in which chatbots may be used may also be stored in domain ontologies 158.

Figure 2:
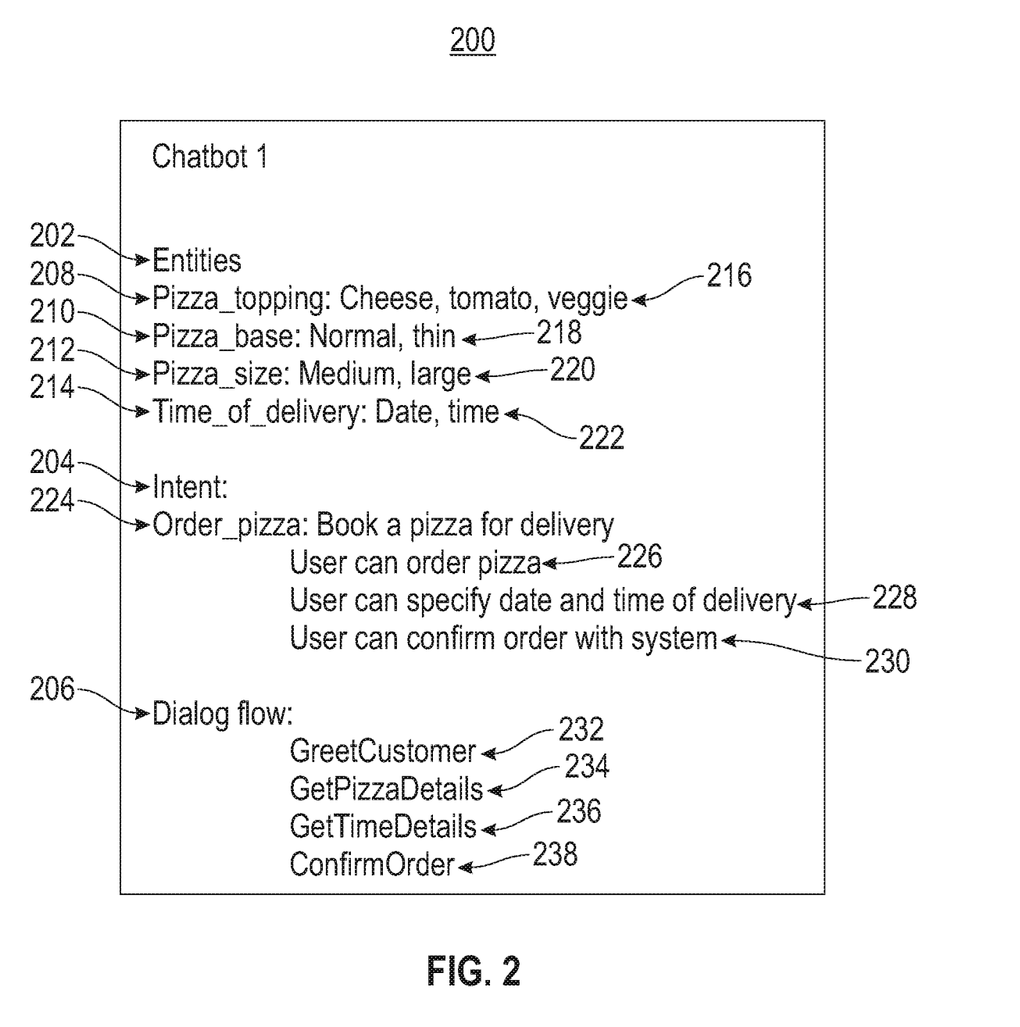
FIG. 2 is a diagram illustrating an example of a chatbot specification associated with a first chatbot according to an embodiment of the invention.

FIG. 2 illustrates an example of a chatbot specification 200 for an example chatbot, e.g., Chatbot 1. As illustrated in FIG. 2, for example, chatbot specification 200 comprises a plurality of characteristics arranged in a plurality of categories. For example, chatbot specification 200 comprises categories of characteristics including entities 202, intent 204, and dialog flow 206.

The category entities 202 comprises entities including Pizza_topping 208, Pizza_base 210, Pizza_size 212, and Time_of_delivery 214. Some or all of the entities also comprise values.

For example, the entity Pizza_topping 208 includes values 216 of cheese, tomato, and veggie, the entity Pizza_base 210 includes values 218 of normal and thin, the entity pizza_size 212 includes values 220 of medium and large, and the entity Time_of_delivery 214 includes values 222 of the date and time when delivery is required.

The category intent 204 comprises one or more intents including, for example, Order_pizza 224 which allows a user to book a pizza for delivery. Other intents may also be present in other examples. Intent Order_pizza 224 comprises values associated with ordering a pizza including, for example, user can order pizza 226, user can specify date and time of delivery 228, and user can confirm order with the system 230.

The category dialog flow 206 comprises one or more dialog flow values associated with a dialog flow that the chatbot will use to interact with a customer or other user. In this example, the dialog flow values may include, for example, GreetCustomer 232, GetPizzaDetails 234, GetTimeDetails 236, and ConfirmOrder 238.

Figure 3:
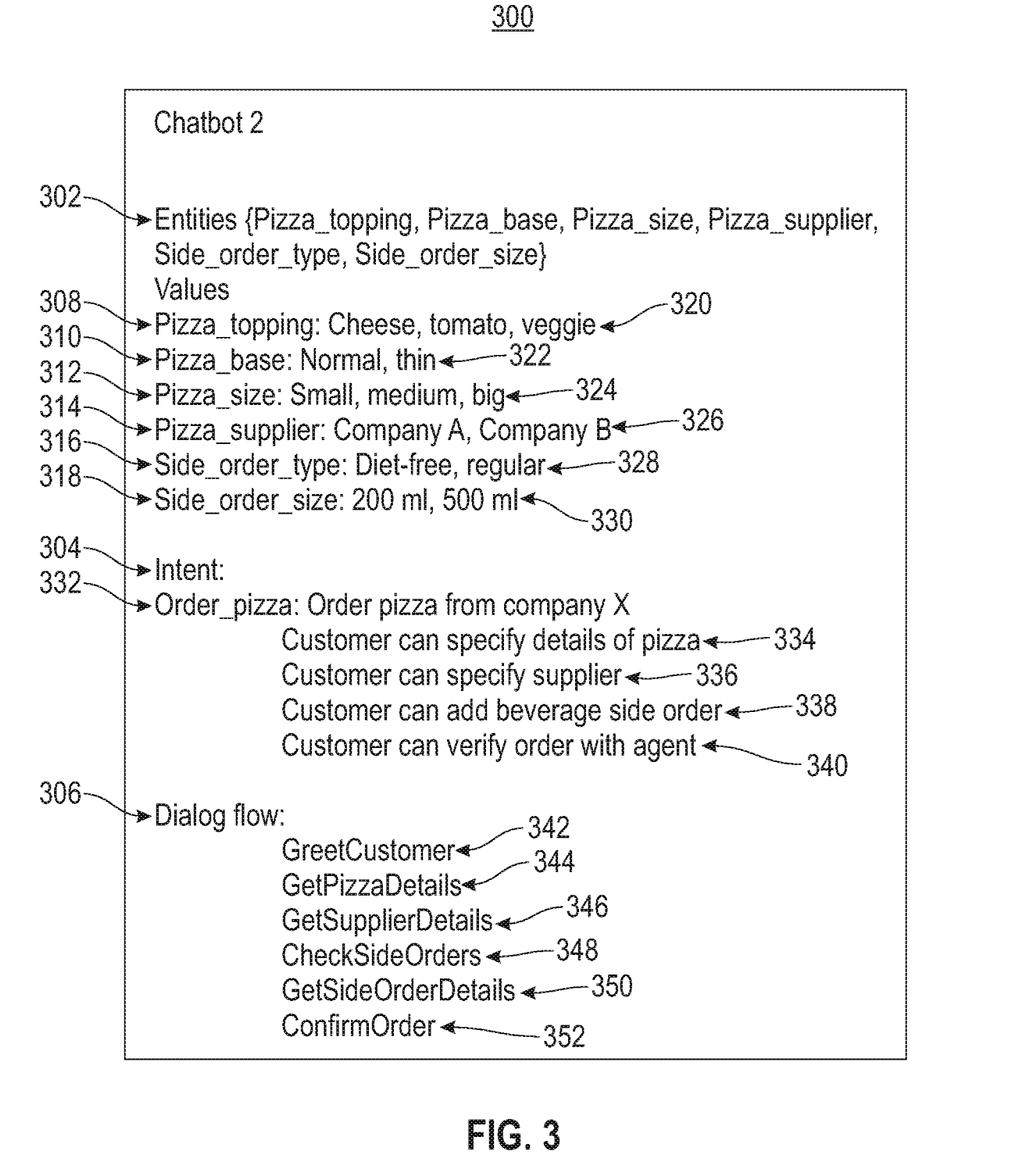
FIG. 3 is a diagram illustrating an example of a chatbot specification associated with a second chatbot according to an embodiment of the invention.

FIG. 3 illustrates an example of a chatbot specification 300 for another example chatbot, e.g., Chatbot 2. As illustrated in FIG. 3, for example, chatbot specification 300 comprises a plurality of characteristics arranged in a plurality of categories. For example, chatbot specification 300 comprises categories of characteristics including entities 302, intent 304, and dialog flow 306.

The category entities 302 comprise entities including Pizza_toppings 308, Pizza_base 310, Pizza_size 312, Pizza_supplier 314, Side_order_type 316, and Side_order_size 318. Some or all of the entities also comprise values.

For example, the entity Pizza_topping 308 includes values 320 of cheese, tomato, and veggie, the entity Pizza_base 310 includes values 322 of normal and thin, the entity pizza_size 312 includes values 324 of small, medium and big, the entity Pizza_supplier 314 includes values 326 of Company A and Company B, the entity Side_order_type 316 includes values 328 of Diet-free and regular, and the entity Side_order_size 318 includes values 330 of 200 ml and 500 ml.

The category intent 304 comprises one or more intents including, for example, Order_pizza 332 which allows a user to order pizza from company X, where X is a placeholder for a company identified by a user via the chatbot dialog such as company A or company B. Other intents may also be present in other examples. Intent Order_pizza 332 comprises values associated with ordering a pizza including, for example, customer can specify details of pizza 334, customer can specify company 336, customer can add beverage side order 338, and customer can verify order with agent 340.

The category dialog flow 306 comprises one or more dialog flow values associated with a dialog flow that the chatbot will use to interact with a customer or other user. In this example, the dialog flow values may include, for example, GreetCustomer 342, GetPizzaDetails 344, GetSupplierDetails 346, CheckSideOrders 348, GetSideOrderDetails 350, and ConfirmOrder 352.

As can be seen in FIGS. 2 and 3, each chatbot specification may have a different format and may comprise different categories, characteristics, or other information. Because of this, comparing the characteristics of chatbots may be a difficult and arduous task as the user must sift through the information contained in each chatbot specification and reconcile the formats and information contained in each chatbot specification to determine what similarities and differences between the chatbots are present.

Figure 4:
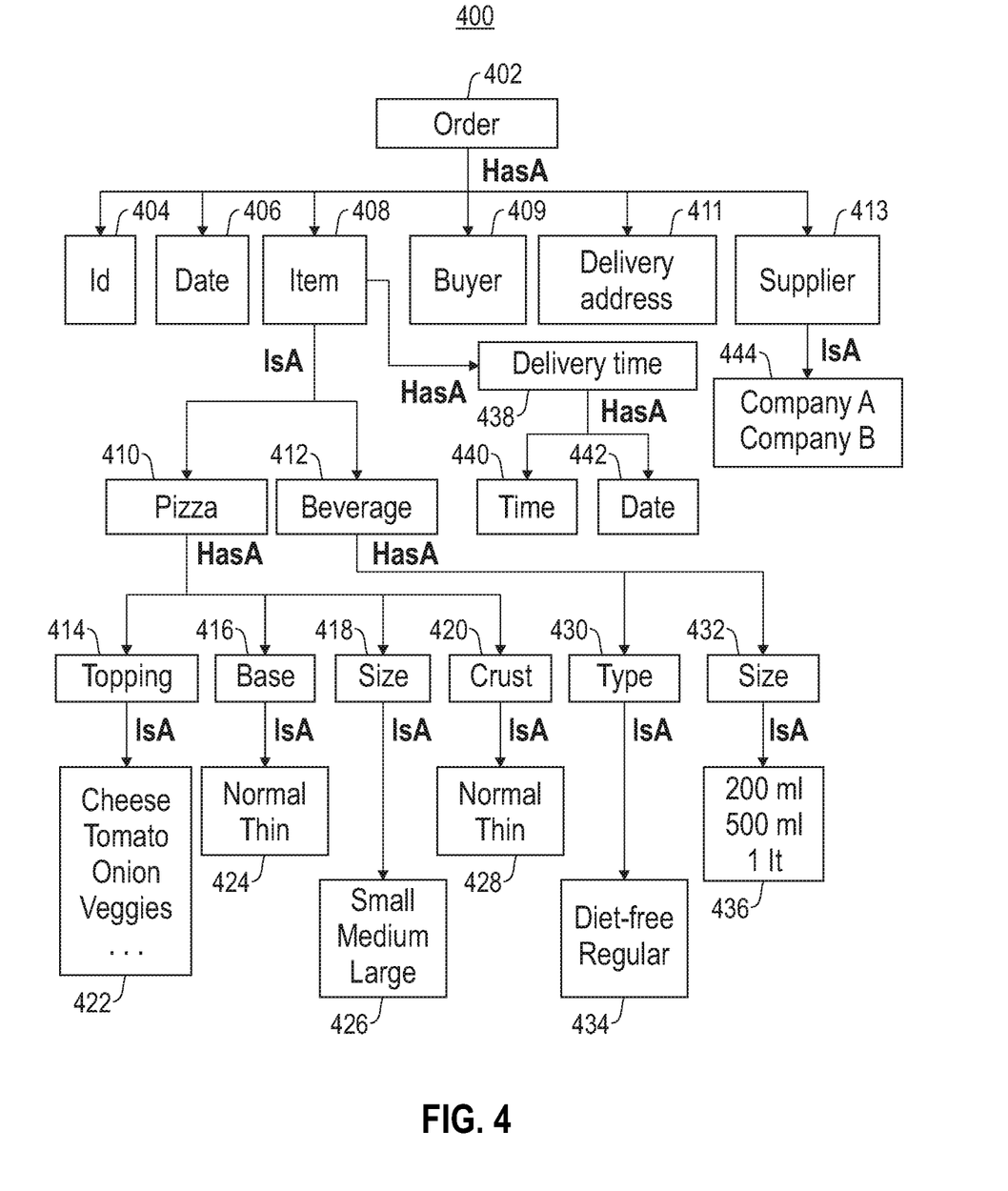
FIG. 4 is a diagram illustrating an example of a domain ontology according to an embodiment of the invention.

FIG. 4 illustrates a block diagram of an example domain ontology from the repository of domain ontologies 158, e.g., ontology 400, for a domain associated with chatbot specifications 200 and 300. For example, the domain of the ontology 400 may be ordering a pizza, which is a domain shared by both chatbot specification 200 and chatbot specification 300. While described with reference to an ontology 400 for ordering pizza below, ontologies for any other domains may be included in the repository of domain ontologies 158.

Ontology 400 comprises information and characteristics associated with an order 402 for pizza. In some embodiments, ontology 400 includes a full set of all characteristics that may be used to order a pizza, although in some cases such characteristics may be formatted or defined differently than those found in chatbot specifications. In such cases, semantic analysis may be used to match characteristics found in chatbot specifications to the corresponding characteristics that are found in the full set included as part of the ontology.

Ontology 400 is presented in FIG. 4 as a tree including nodes with connecting indicators "HasA" and "IsA". The "HasA" indicator is used to indicate that a node includes the content of its sub-nodes. For example, an order 402 has a buyer 409. The "IsA" indicator is used to indicate a content of the node itself. For example, an item 408 is a pizza 410.

Ontology 400 includes an order 402. Order 402 has a plurality of characteristics including Id 404, date 406, item 408, buyer 409, delivery address 411, and supplier 413.

Id 404 denotes an identifier for an order. For example, Id 404 may uniquely identify an order, e.g., order #1, order #2, etc., or may identify an order in any other manner.

Date 406 identifies a date, time, or both on which an order is placed.

Item 408 identifies the subject of an order. In this example, an item 408 may be a pizza 410, a beverage 412, or both. In addition, an item 408 has a delivery time 438 which has a time 440 and a date 442 at which the item should be delivered to the user.

A pizza 410 has a topping 414, a base 416, a size 418, and a crust 420. A topping 414 for a pizza 410 is selected from a set of toppings 422 such as, e.g., cheese, tomato, onion, veggies, or any other topping or any combination thereof. A base 416 for a pizza 410 is selected from a set of bases 424 such as, e.g., normal and thin. A size 418 of a pizza 410 is selected from a set of sizes 426 such as, e.g., small, medium, and large. A crust 420 of a pizza 410 is selected from a set of crusts 428 such as, e.g., normal and thin.

A beverage 412 has a type 430 and a size 432. A type 430 for a beverage 412 is selected from a set of types 434 such as, e.g., diet-free, regular, or any other type of beverage. A size 432 for a beverage 412 is selected from a set of sizes 436 such as, e.g., 200 ml, 500 ml, 1 liter, or any other size.

Buyer 409 identifies a user which is placing an order.

Delivery address 411 identifies an address to which an order is to be delivered.

Supplier 413 identifies a supplier of an order. For example, the supplier 413 of an order is selected from a set of suppliers 444, e.g., company A or company B in this example.

In illustrative embodiments, chatbot comparison logic 122 obtains inputs from a user including a user selection of one or more chatbot specifications for comparison. For example, chatbot specifications 200 and 300 may be selected by a user, e.g., via input device 120. Any number of chatbot specifications may be selected by the user. In some embodiments, a user may also or alternatively select a domain for which the user would like chatbots to be compared. For example, the user may select a domain for ordering a pizza and every chatbot that is included in the domain may be included as part of the comparison.

Chatbot comparison logic 122 also obtains a user selection of a domain ontology associated with the domain of the chatbots to be compared as an input, e.g., via input device 120. For example, domain ontology 400 may be selected for use in comparing chatbot specifications 200 and 300 or for comparing any chatbot specifications of chatbots that are included in the domain of ordering a pizza. The selected domain ontology 400 may be retrieved by chatbot comparison logic 122 from the repository of domain ontologies 158 stored in memory 154 of the data repository.

In some embodiments, chatbot comparison logic 122 may obtain a single chatbot specification and the domain ontology associated with the domain of that chatbot specification as an input, for example, where the user wishes to compare the single chatbot specification to the entire domain.

Chatbot comparison logic 122 generates outputs based at least in part on the selected inputs, e.g., chatbot specifications, domain ontologies, etc., which present a comparison of the chatbot specifications to each other and to the domain ontology as desired.

In some embodiments, the characteristics of each chatbot specification may first be mapped to corresponding characteristics in the domain ontology for the domain of that chatbot. For example, the entities found in a chatbot specification may be mapped to corresponding entities found in the domain ontology, entity values for each entity in the chatbot specification may be mapped to corresponding entity values in the domain ontology, intents found in the chatbot specification may be mapped to corresponding intents found in the domain ontology, and dialog states found in the chatbot specification may be mapped to corresponding dialog states found in the domain ontology.

For example, where both chatbot specifications 200 and 300 are for chatbots in the domain of ordering a pizza, the characteristics of these chatbots, as found in their respective chatbot specifications, may first be mapped to corresponding characteristics found in the full set of characteristics of the corresponding domain ontology, e.g., ontology 400. Where the format or content of a particular characteristic, e.g., Pizza_topping: cheese, matches a corresponding characteristic of the domain ontology, no modification of that characteristics may be needed for the purposes of comparison.

On the other hand, where the format or content of a particular characteristic differs from that found in the domain ontology, the characteristic may be modified for the purposes of comparison, for example, using synonyms, a thesaurus, a dictionary, or other similar tools to identify the corresponding characteristic in the domain ontology. If entities are not directly specified in structured format, but need to be extracted from unstructured format like logs, NLP tools can be used for entity extraction. If an entity cannot be directly matched to a concept in the ontology, then synonyms, thesauri, and dictionaries may be used to map it to the ontology characteristics. In some embodiments, the mapping may also be validated by checking the entity values corresponding to the mapped entity against the corresponding entity values found in the ontology.

As an example, chatbot specification 300 includes entity values 324 for Pizza_size 312 of small, medium, and big. Ontology 400 includes a set of sizes 426 of small, medium, and large. Since big is not included in the ontology 400, further semantic analysis may be used to find a mapping for big within the ontology 400. For example, semantic analysis may utilize synonyms, thesauri, dictionaries, or other similar sources in an attempt to map big to one of the characteristics in the ontology 400. In this case, big is a synonym for large so big will be mapped to large in the comparison.

In some embodiments, when mapping intents to the domain ontology, statement-level comparison techniques may be utilized to identify the corresponding intents in the domain ontology. In some embodiments, the intents found in the chatbot specifications may be expressed in a natural language format, e.g., "user can order pizza". In some embodiments, natural language processing tools may be utilized for parsing the intents for terms that may be used in mapping the intents to the domain ontology.

In some embodiments, for example, intent-mapping may be performed in an iterative 2-step process. The terms in the intent may be mapped to the entity space. For example, for the intents "User can order a pizza" and "Customer can specify details of pizza," the term "pizza" in each case is extracted and mapped to "pizza" in the domain ontology, while the other terms may not map to any corresponding terms in the domain ontology. The entity values of the mapped entities are mapped to the inputs in the dialog, where these constitute an input requirement. The inputs are then mapped to the intent, via the corresponding state. API call information such as, e.g., chatbot logs or other similar information, may also be used to identify entity information and entity values. For example, the chatbot may be executed for a period of time to identify the various characteristics, entities, intents, and dialog states that may be utilized.

In some embodiments, for example, text found in the intents or dialog states of the chatbot specifications may be parsed to extract terms which may be mapped to the domain ontology. For example, an intent that states "user can order pizza" may be parsed to extract the terms "pizza" and "order" which may be mapped to the domain ontology. As another example, an intent that states "customer can book pizza for delivery" may be parsed to extract terms "pizza" and "book". Since the term "book" is not included in the domain ontology, synonyms may be used to map the term "book" to the term "order" in the domain ontology.

In some embodiments, chatbot comparison logic 122 may compare input triggers, output responses, and changes in state when determining the differences between the dialog states of each of the chatbot specifications. For example, when comparing the dialog states of two chatbots, the dialog state names may be assumed to be identifiers rather than content where the comparison is instead based on the actual values of inputs and outputs. For example, in some embodiments, semantic analysis of the dialog state names need not be used to compare dialog states. Instead, entities and actions may be identified from the input or output responses of each dialog state in a similar manner to that described above for the intents and may be matched according to the corresponding concepts in the domain ontology. In some embodiments, the dialog states of two chatbot specifications are comparable when they have at least 1 common input trigger or at least 1 common output response.

Once the characteristics of each chatbot specification have been mapped to corresponding characteristics in the domain ontology, chatbot comparison logic 122 may semantically analyze each chatbot specification using the mappings to identify differences between the chatbot specifications or differences between a chatbot specification and the domain ontology as a whole. For example, by mapping each chatbot specification to a common set of characteristics as found in the corresponding domain ontology, any number of chatbot specifications may be compared even though each may have its own unique format or structure.

In some embodiments, for example, chatbot comparison logic may generate an output that compares the characteristics of each chatbot specification as illustrated below in example Table 1.

TABLE 1

|  | Common | Exclusive to Chatbot 1 | Exclusive to Chatbot 2 |
| --- | --- | --- | --- |
| Entities | Pizza_topping<br>Pizza_base<br>Pizza_size | Time_of_delivery | Pizza_supplier<br>Side_order_type<br>Side_order_size |
| Entity Values | Pizza_topping: Cheese, tomato, veggie<br>Pizza_base: Normal, thin<br>Pizza_size: Medium, large | Time_of_delivery: Date, time | Pizza_size: Small<br>Pizza_supplier: Company A, Company B<br>Side_order_type: Diet-free, regular<br>Side_order_size: 250 ml, 500 ml |
| Intent | Order pizza<br>Confirm order | Specify date and time of delivery | Specify supplier<br>Add beverage side order |
| Dialog state | GreetCustomer<br>GetPizzaDetails<br>ConfirmOrder | GetTimeDetails | GetSupplierDetails<br>GetSideOrderDetails<br>CheckSideOrderDetails |

As can be seen in Table 1, the characteristics used for comparison are those that are found in the domain ontology, e.g., a Pizza_size of large is used instead of big for the purposes of comparison which results in an indication that a large pizza_size is common between the chatbot specifications 200 and 300 even though the terminology used in each specification differs. In some embodiments, the comparison shown in Table 1 may be presented to a user, e.g., via display 118.

In some embodiments, chatbot comparison logic 122 generates a natural-language format of the comparison for presentation to a user, e.g., via display 118. For example, a natural-language format may be generated based on templates and the identified differences or using known natural language generation techniques. An example of a natural-language format of the differences identified between Chatbots 1 and 2 is shown below in Table 2.

TABLE 2

Sample Natural Language Output

Chatbot 1 and Chatbot 2 share Pizza_base and Pizza_topping as entities, with the same entity values.
Chatbot 1 and Chatbot 2 share Pizza_size as an entity, with different entity values. Chatbot 1 has entity values medium and large, and Chatbot 2 has entity values small, medium and large.
Chatbot 1 has a Time_of_delivery entity.
Chatbot 2 has Pizza_supplier, Side_order_type and Side_order_size entities.
Chatbot 1 and Chatbot 2 share order a pizza and confirm order as intents.
Chatbot 1 supports intent to specify a date and time of delivery.
Chatbot 2 supports intent to specify a supplier.
Chatbot 2 supports intent to add a beverage side order.
Chatbot 1 and Chatbot 2 share GreetCustomer, GetPizzaDetails, and ConfirmOrder dialog states.
Chatbot 1 supports a GetTimeDetails dialog state
Chatbot 1 supports GetSupplierDetails, GetSideOrderDetails, and CheckSideOrderDetails dialog states.

In some embodiments, chatbot comparison logic 122 may quantify the differences between chatbot specifications. For example, rating for each chatbot may be generated based on any manner of quantification techniques.

In an example embodiment, with reference now to Table 3, below, the intents, entities, and entity values of each chatbot may be quantified relative to the total number of unique intents, entities, and entity values between the chatbot specifications to generate a rating for each chatbot with respect to each of the intents, entities, and entity values.

TABLE 3

| Metrics | Chatbot 1 | Chatbot 2 | Rating | Comment |
| --- | --- | --- | --- | --- |
| Intents | 4 | 6 | Chatbot 2: 0.86<br>Chatbot 1: 0.57 | 7 unique intents in all |
| Entities | 4 | 6 | Chatbot 2: 0.86<br>Chatbot 1: 0.57 | 7 unique entities in all |
| Entity value | 9 | 14 | Chatbot 2: 0.88<br>Chatbot 1: 0.56 | 16 unique entity values in all |

For example, as seen in Table 3 with reference also to Table 1 and FIGS. 2 and 3, chatbot specifications 200 and 300 include seven unique intents, seven unique entities, and 16 unique entity values between them. In this example, the chatbot specification 200 for Chatbot 1 supports four intents, and the chatbot specification 300 for Chatbot 2 supports six intents. In one example quantification, the ratio of intents to total number of unique intents may be quantified to generate a rating for each chatbot. For example, Chatbot 1 supports four out of seven (4/7) intents for a rating of 0.57 while Chatbot 2 supports six out of seven (6/7) intents for a rating of 0.86.

Likewise, the chatbot specification 200 for Chatbot 1 supports 4 entities and the chatbot specification 300 for Chatbot 2 supports six entities. In one example quantification, the ratio of entities to total number of unique entities may be quantified to generate a rating for each chatbot. For example, Chatbot 1 supports four out of seven entities (4/7) for a rating of 0.57 while Chatbot 2 supports six out of seven (6/7) entities for a rating of 0.86.

The chatbot specification 200 for Chatbot 1 also supports nine entity values and the chatbot specification 300 for Chatbot 2 supports fourteen entity values. In one example quantification, the ratio of entity values to the total number of unique entity values may be quantified to generate a rating for each chatbot. For example, Chatbot 1 supports nine out of sixteen (9/16) entity values for a rating of 0.56, while Chatbot 2 supports fourteen out of sixteen (14/16) entity values for a rating of 0.88.

In this example, Chatbot 2 is superior to Chatbot 1 in each category of characteristic. In some embodiments one chatbot may be superior in some categories of characteristics while another chatbot may be superior in other categories of characteristics.

In some embodiments, the quantification of characteristics, as illustrated by example in Table 3, may be presented to a user, e.g., via display 118. In some embodiments, the chatbot having the superior rating for each category of characteristic may be highlighted or have some other indication to indicate that it has a higher rating. For example, in some embodiments, the rating for the chatbot with the highest rating in each category of characteristic may have its rating highlighted, bolded, or provided with some other indication that it has the highest rating.

In some embodiments, each intent, entity, or entity value may have a respective weight that denotes its relative importance in the domain. In the example of Table 3 presented above, the weights for each intent, entity, and entity value are assumed to be equal to one, e.g., no weight is used. In an alternative example, the entity Time_of_delivery in chatbot specification 200 may be more important than the Side_order_type and Side_order_size entities of chatbot specification 300. In such a case, for example, the entity Time_of_delivery may have a weight of three while the Side_order_type and Side_order_size entities may each have weights of 0.5. In such an example, assuming all other intents, entities, and entity values have a weight of 1, the resulting ratings may be as shown in Table 4, below.

TABLE 4

| Metrics | Chatbot 1 | Chatbot 2 | Rating | Comment |
|---|---|---|---|---|
| Intents | 4 | 6 | Chatbot 2: 0.86 Chatbot 1: 0.57 | 7 weighted unique intents in all |
| Entities | 6 | 5 | Chatbot 1: 0.86 Chatbot 2: 0.71 | 7 weighted unique entities in all |
| Entity value | 9 | 14 | Chatbot 2: 0.88 Chatbot 1: 0.56 | 16 weighted unique entity values in all |

As seen in Table 4, above, for example, the entities value for Chatbot 1 is now increased to six from four since the Time_of_delivery entity now counts for three points instead of one. Likewise, the entities value for Chatbot 2 is now decreased from six to five since each of the Side_order_type and Side_order_size entities now count for half a point instead of one point. In this example, the total number of unique entities stays the same at seven. The resulting rating for Chatbot 1 is now 0.86 (6/7) while the rating for Chatbot 2 has fallen to 0.71 (5/7). As can be seen in Table 4, the rating for Chatbot 1 is now highlighted as being the superior rating.

In some embodiments, the value for total number of unique entities that is used in determining the rating may alternatively be based at least in part on the weights of each entity. For example, if the weight of the Time_of_delivery entity is three, and the weight of the Side_order_type and Side_order_size entities are one-half each, the total number of unique entities may be eight (three for common entities, three for Time_of_delivery, one-half for each of the Side_order_type and Side_order_size entities, and one for the Pizza_supplier entity). In this example, based on the weighted total number of unique entities, the final entity rating for Chatbot 1 may alternatively be 0.75 while the final entity rating for Chatbot 2 may alternatively be 0.63.

In some embodiments, the number of unique intents, entities, and entity values may alternatively be determined based on the full set of characteristics found in the domain ontology corresponding to the domain of the chatbots, in this example, domain ontology 400. In such an example, the resulting ratings may be as shown in Table 5, below.

TABLE 5

| Metrics | Chatbot 1 | Chatbot 2 | Rating | Comment |
|---|---|---|---|---|
| Intents | 4 | 6 | Chatbot 2: 0.75 Chatbot 1: 0.50 | 8 unique intents in domain ontology |
| Entities | 4 | 6 | Chatbot 2: 0.75 Chatbot 1: 0.50 | 8 unique entities in domain ontology |
| Entity value | 9 | 14 | Chatbot 2: 0.70 Chatbot 1: 0.45 | 20 unique entity values in domain ontology |

As seen in Table 5, above, for example, the total number of unique intents is increased to 8, the total number of unique entities is increased to 8, and the total number of unique entity values is increased to 20, which reflect the total number of characteristics of each category in the domain ontology 400. In this example, the intents rating for Chatbot 1 is now 0.50 (4/8) while the intents rating for Chatbot 2 is 0.75 (6/8), the entities rating for Chatbot 1 is now 0.50 (4/8) while the entities rating for Chatbot 2 is 0.75 (6/8), and the entity value rating for Chatbot 1 is now 0.45 (9/20) while the entity value rating for Chatbot 2 is 0.70 (14/20). These ratings reflect the difference between each of chatbot specifications 200 and 300 and the domain ontology 400 as a whole, with the chatbot that has the superior rating in each category being more closely matched to the domain ontology 400.

In some embodiments, a user may select a single chatbot specification for comparison to the relevant domain ontology. For example, the user may select the chatbot specification 200 of Chatbot 1 for comparison to domain ontology 400. Such a comparison may include a quantification of the characteristics found in the chatbot specification 200 for each category relative to the full set of characteristics found in the domain ontology 400. Table 6, below, provides an example of such a comparison.

TABLE 6

| Metrics | Chatbot 1 | Domain ontology | Rating |
|---|---|---|---|
| Intents | 4 | 8 | Chatbot 1: 0.50 |
| Entities | 4 | 8 | Chatbot 1: 0.50 |
| Entity value | 9 | 20 | Chatbot 1: 0.45 |

As seen in Table 6, above, for example, the total full set of intents found in the domain ontology 400 is 8, the full set of entities found in the domain ontology 400 is 8, and the full set of entity values found in the domain ontology 400 is 20. In this example, the intents rating for Chatbot 1 relative to the domain ontology is 0.50 (4/8), the entities rating for Chatbot 1 relative to the domain ontology is 0.50 (4/8), and the entity value rating for Chatbot 1 relative to the domain ontology is 0.45 (9/20). These ratings may be used by a user to determine how close the capabilities of a chatbot are to the full set of capabilities available in the domain ontology.

Figure 5:
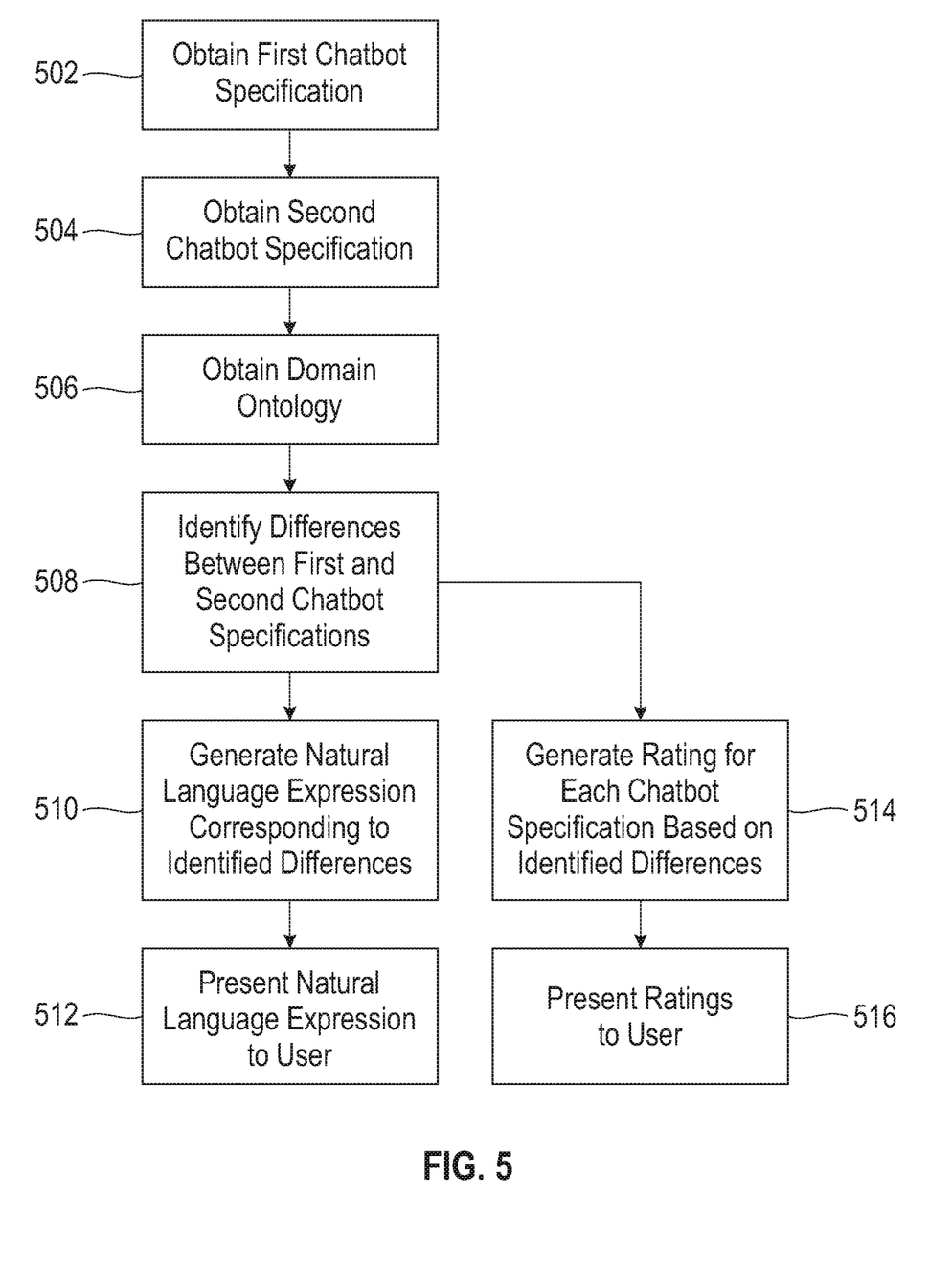
FIG. 5 is a flow diagram illustrating techniques according to an embodiment of the invention.

With reference now to FIG. 5, a method implemented by chatbot comparison logic 122 according to an illustrative embodiment will now be described.

At 502, chatbot comparison logic 122 obtains a first chatbot specification for a first chatbot, e.g., chatbot specification 200. For example, a user may select a first chatbot specification for comparison, e.g., via input device 120.

At 504, chatbot comparison logic 122 obtains a second chatbot specification for a second chatbot, e.g., chatbot specification 300. For example, a user may select a first chatbot specification for comparison, e.g., via input device 120.

At 506, chatbot comparison logic 122 obtains a domain ontology corresponding to a domain associated with the first and second chatbot specifications, e.g., domain ontology 400. For example, a user may select the domain ontology as described above, e.g., via input device 120.

At 508, chatbot comparison logic 122 identifies the difference between the first and second chatbot specifications. For example, chatbot comparison logic 122 may map the characteristics of each chatbot specification to corresponding characteristics found in the domain ontology and may determine the differences between the chatbot specifications as described above.

At 510, chatbot comparison logic 122 generates a natural language expression corresponding to the identified differences as described above.

At 512, chatbot comparison logic 122 presents the natural language expression of the differences to a user, for example, via display 118.

In some embodiments, with reference back to step 508, chatbot comparison logic 122 may also or alternatively generate ratings for each chatbot specification based on the identified differences at 514. For example, the ratings may be based on a comparison of the characteristics of each category of each chatbot specification relative to a number of unique characteristics of each category found in the combination of the chatbot specifications, relative to a number of characteristics in each category in the full set of characteristics found in the domain ontology, or in any of the other manners described above.

At 516, chatbot comparison logic 122 presents the ratings to a user, for example, via display 118. In some embodiments, chatbot comparison logic 122 may highlight or otherwise indicate which chatbot specification has the superior rating for each category of characteristics.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
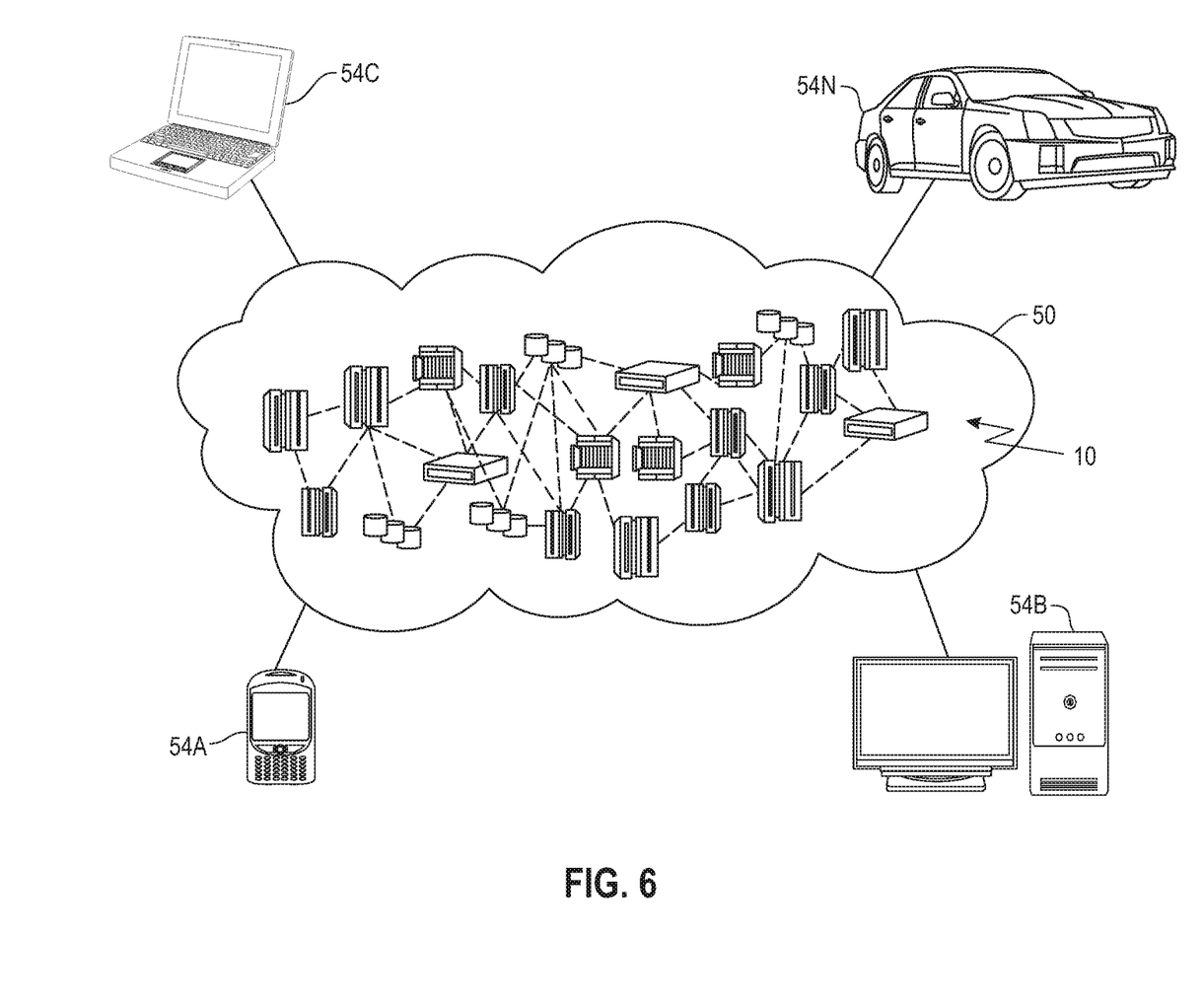
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
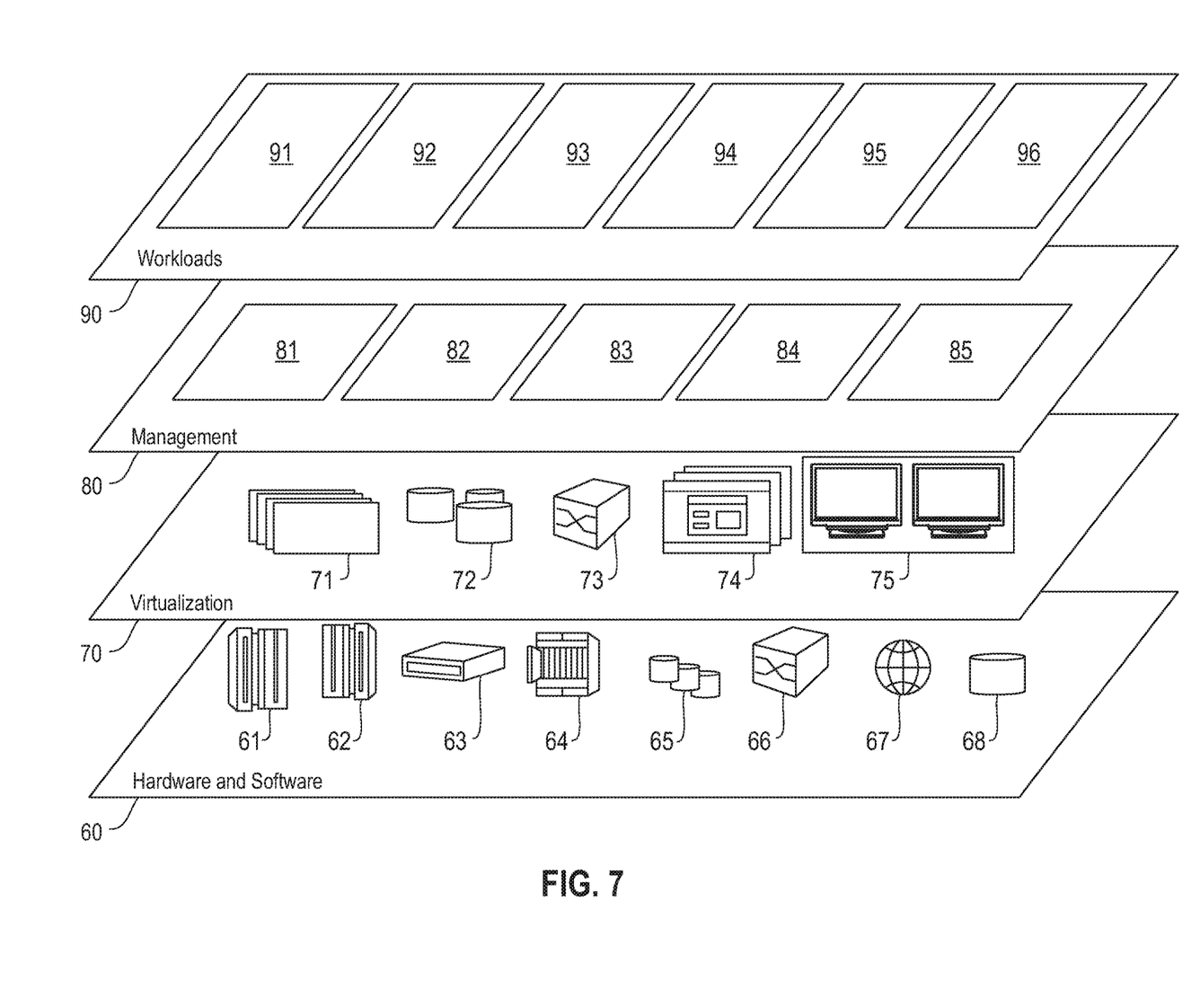
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chatbot comparison logic 96.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
    obtaining a first chatbot specification associated with a first chatbot, the first chatbot specification comprising a first plurality of characteristics arranged in a plurality of categories;
    obtaining a second chatbot specification associated with a second chatbot, the second chatbot specification comprising a second plurality of characteristics arranged in the plurality of categories;
    identifying, based at least in part on the first plurality of characteristics and the second plurality of characteristics, one or more differences between the first plurality of characteristics and the second plurality of characteristics for each of the plurality of categories;
    quantifying the identified differences for each category against the characteristics of that category, wherein said quantifying comprises determining a rating for each of the first and second chatbots with respect to each category, wherein said determining the rating for each of the first and second chatbots with respect to a given category comprises:
        determining a total number of unique characteristics in the given category;
        determining a first rating for the first chatbot based at least in part on the ratio of the number of characteristics in the first plurality of characteristics associated with the first chatbot and the total number of unique characteristics; and
        determining a second rating for the second chatbot based at least in part on the ratio of the number of characteristics in the second plurality of characteristics associated with the second chatbot and the total number of unique characteristics;
    generating a natural language expression corresponding to the identified one or more differences; and
    presenting, to a user via a graphical user interface, (i) the generated natural language expression and (ii) the rating for each of the first and second chatbots with respect to each category;
    wherein the steps are carried out by at least one computing device.

2. The computer-implemented method of claim 1, wherein the plurality of categories comprises intents, entities, entity values, and dialog states.

3. The computer-implemented method of claim 1, wherein said presenting the rating for each of the first and second chatbots with respect to each category to the user via the graphical user interface comprises presenting an indication of which of the first and second chatbots has a higher rating in each of the categories.

4. The computer-implemented method of claim 1, comprising:
    obtaining a domain ontology corresponding to a domain of the first and second chatbots, wherein the first and second pluralities of characteristics are mapped to characteristics in the domain ontology.

5. The computer-implemented method of claim 4, comprising:
    determining a difference between the first plurality of characteristics and the characteristics in the domain ontology for each category based on the mapping;
    determining a difference between the second plurality of characteristics and the characteristics in the domain ontology for each category based on the mapping;
    rating each of the first and second chatbots relative to the domain ontology for each category, based at least in part on (i) the determined difference between the first plurality of characteristics and the characteristics in the domain ontology for each category and (ii) the determined difference between the second plurality of characteristics and the characteristics in the domain ontology for each category; and
    presenting the rating of each of the first and second chatbots relative to the domain ontology to the user via the graphical user interface.

6. A computer program product comprising a computer readable storage medium having program instructions embodied therewith, the program instructions executable by a computing device to cause the computing device to:
    obtain a first chatbot specification associated with a first chatbot, the first chatbot specification comprising a first plurality of characteristics arranged in a plurality of categories;
    obtain a second chatbot specification associated with a second chatbot, the second chatbot specification comprising a second plurality of characteristics arranged in the plurality of categories;
    identify, based at least in part on the first plurality of characteristics and the second plurality of characteristics, one or more differences between the first plurality of characteristics and the second plurality of characteristics for each of the plurality of categories;
    quantify the identified differences for each category against the characteristics of that category, wherein said quantifying comprises determining a rating for each of the first and second chatbots with respect to each category, wherein said determining the rating for each of the first and second chatbots with respect to a given category comprises:
        determining a total number of unique characteristics in the given category;
        determining a first rating for the first chatbot based at least in part on the ratio of the number of characteristics in the first plurality of characteristics associated with the first chatbot and the total number of unique characteristics; and
        determining a second rating for the second chatbot based at least in part on the ratio of the number of characteristics in the second plurality of characteristics associated with the second chatbot and the total number of unique characteristics;

generate a natural language expression corresponding to the identified one or more differences; and present, to a user via a graphical user interface, (i) the generated natural language expression and (ii) the rating for each of the first and second chatbots with respect to each category.

7. The computer program product of claim 6, wherein said presenting the rating for each of the first and second chatbots with respect to each category to the user via the graphical user interface comprises presenting an indication of which of the first and second chatbots has a higher rating in each of the categories.

8. The computer program product of claim 6, wherein the program instructions further cause the computing device to obtain a domain ontology corresponding to a domain of the first and second chatbots, wherein the first and second pluralities of characteristics are mapped to characteristics in the domain ontology.

9. The computer program product of claim 8, wherein the program instructions further cause the computing device to:
determine a difference between the first plurality of characteristics and the characteristics in the domain ontology for each category based on the mapping;
determine a difference between the second plurality of characteristics and the characteristics in the domain ontology for each category based on the mapping;
rate each of the first and second chatbots relative to the domain ontology for each category, based at least in part on (i) the determined difference between the first plurality of characteristics and the characteristics in the domain ontology for each category and (ii) the determined difference between the second plurality of characteristics and the characteristics in the domain ontology for each category; and
present the rating of each of the first and second chatbots relative to the domain ontology to the user via the graphical user interface.

10. A system comprising:
a memory; and
at least one processor operably coupled to the memory and configured for:
obtaining a first chatbot specification associated with a first chatbot, the first chatbot specification comprising a first plurality of characteristics arranged in a plurality of categories;
obtaining a second chatbot specification associated with a second chatbot, the second chatbot specification comprising a second plurality of characteristics arranged in the plurality of categories;
identifying, based at least in part on the first plurality of characteristics and the second plurality of characteristics, one or more differences between the first plurality of characteristics and the second plurality of characteristics for each of the plurality of categories;
quantifying the identified differences for each category against the characteristics of that category, wherein said quantifying comprises determining a rating for each of the first and second chatbots with respect to each category, wherein said determining the rating for each of the first and second chatbots with respect to a given category comprises:
determining a total number of unique characteristics in the given category;
determining a first rating for the first chatbot based at least in part on the ratio of the number of characteristics in the first plurality of characteristics associated with the first chatbot and the total number of unique characteristics; and
determining a second rating for the second chatbot based at least in part on the ratio of the number of characteristics in the second plurality of characteristics associated with the second chatbot and the total number of unique characteristics;
generating a natural language expression corresponding to the identified one or more differences; and
presenting, to a user via a graphical user interface, (i) the generated natural language expression and (ii) the rating for each of the first and second chatbots with respect to each category.

11. The system of claim 10,
wherein presenting the rating for each of the first and second chatbots with respect to each category to the user via the graphical user interface comprises presenting an indication of which of the first and second chatbots has a higher rating in each of the categories.

12. The system of claim 10, wherein the at least one processor is further configured for obtaining a domain ontology corresponding to a domain of the first and second chatbots, wherein the first and second pluralities of characteristics are mapped to characteristics in the domain ontology.

13. The system of claim 12, wherein the at least one processor is further configured for:
determining a difference between the first plurality of characteristics and the characteristics in the domain ontology for each category based on the mapping;
determining a difference between the second plurality of characteristics and the characteristics in the domain ontology for each category based on the mapping;
rating each of the first and second chatbots relative to the domain ontology for each category, based at least in part on (i) the determined difference between the first plurality of characteristics and the characteristics in the domain ontology for each category and (ii) the determined difference between the second plurality of characteristics and the characteristics in the domain ontology for each category; and
presenting the rating of each of the first and second chatbots relative to the domain ontology to the user via the graphical user interface.

* * * * *